United States Patent [19]

Ohlig

[11] Patent Number: 4,812,883
[45] Date of Patent: Mar. 14, 1989

[54] GRAPHIC MATERIAL REGISTRATION APPARATUS AND METHOD

[76] Inventor: Ernest Ohlig, 2306 Holiday Rd., Newport Beach, Calif. 92660

[21] Appl. No.: 131,377

[22] Filed: Dec. 10, 1987

[51] Int. Cl.$^4$ .............................................. G03B 27/20
[52] U.S. Cl. ..................................................... 355/91
[58] Field of Search ........................ 355/83, 85, 53, 91, 355/93, 94, 104, 122; 354/299; 248/362

[56] References Cited

U.S. PATENT DOCUMENTS

| | | | |
|---|---|---|---|
| 3,813,682 | 5/1974 | Nishikawa et al. | 95/31 R |
| 3,890,042 | 6/1975 | Miyauchi et al. | 355/53 |
| 3,955,163 | 5/1976 | Novak | 355/91 X |
| 3,995,955 | 12/1976 | Töpfer | 355/91 |
| 4,029,404 | 6/1977 | Mizukami et al. | 355/91 |
| 4,176,949 | 12/1979 | Burgess | 355/104 |
| 4,240,743 | 12/1980 | Hliboki et al. | 355/73 |
| 4,360,259 | 11/1982 | Burgess et al. | 354/299 |
| 4,423,851 | 1/1984 | Heitmann | 248/362 |
| 4,437,759 | 3/1984 | Mizukami et al. | 355/91 |
| 4,449,814 | 5/1984 | Theimer | 355/85 |
| 4,464,047 | 8/1984 | Maher et al. | 355/93 |
| 4,484,813 | 11/1984 | Maher et al. | 355/93 |
| 4,526,463 | 7/1985 | Hickey et al. | 355/83 |
| 4,536,085 | 8/1985 | Hliboki et al. | 355/93 |
| 4,551,016 | 11/1985 | Maher et al. | 355/91 |
| 4,674,868 | 6/1987 | Theimer | 355/122 |
| 4,676,633 | 6/1987 | Burgess et al. | 355/91 |
| 4,707,125 | 11/1987 | Ohlig et al. | 355/94 |

OTHER PUBLICATIONS

Douthitt Catalog & Price List-Feb. 1, 1986; Douthitt Corp., 245 Adair St, Detroit, Mich. 48207-4287.

*Primary Examiner*—Richard A. Wintercorn
*Attorney, Agent, or Firm*—A. C. Smith

[57] ABSTRACT

Improved method and apparatus for supporting photographic sheet materials in intimate surface contact during contact exposure includes a flexible membrane which forms a common boundary wall between two gas-tight chambers. Air at ambient pressure is admitted to one chamber at a controlled rate slower than air is evacuated from the other chamber containing the photographic sheet materials. Progressive expansion of the surface area of contacting force assures that residual volumes of air between photographic sheets are squeezed out in an orderly pattern and not trapped in isolated pockets that distort resulting photographic images.

23 Claims, 5 Drawing Sheets

GRAPHIC MATERIAL REGISTRATION APPARATUS AND METHOD

BACKGROUND OF THE INVENTION

This invention pertains to the method and means for firmly supporting photographic materials in accurate registration during contact exposure, and more particularly to a passive hold-down apparatus and method in which the region beneath an impervious membrane is selectively evacuated in a manner that develops a spreading or migrating hold-down force.

Contact exposure of photographic copy and master sheets requires accurate registration between such sheets during exposure. Certain known schemes rely upon the sheets being pressed together and against an exposure plate by various mechanisms in order to maintain the sheets in accurate registration during exposure through the exposure plate. One known mechanism depends upon a flexible, weighted blanket being rolled out over the photographic sheets to hold them in place on the exposure plate. Still other known mechanisms rely upon air pressure or resilient means to force the photographic sheets together and against the exposure plate during exposure. Mechanisms of these types are disclosed in the literature (see, for example, U.S. Pat. Nos. 4,029,404 and 4,551,016 and 4,674,868 and 4,707,125). One common disadvantage associated with mechanisms of these types is that air pockets may remain at random locations between the photographic master and copy sheets and between the exposure plate and sheets that may produce distorted photographic images due to non-contacting reproduction where the air pockets are located. Excessive pressure applied to the photographic sheets to assure that no air pockets remain unnecessarily increases the weight, strength and costs of the exposure plate and associated supporting structures, in order to withstand the pressing forces, and may contribute to distortion of the sheets which may be forced to 'flow' and reform around an air pocket. In addition, excessive pressure applied to photographic sheets, particularly of plastic materials, introduces stresses which may form Newton rings in the reproduction, especially under exposure to collimated light.

SUMMARY OF THE INVENTION

In accordance with the present invention, a passive, pressure differential is established about a flexible membrane that covers the photographic sheets and the exposure plate in a manner that assures removal of air pockets from between the photographic sheets as the force attributable to ambient air pressure is progressively applied. A migrating or spreading region of applied force progressively squeezes out residual air from between the photographic sheets and inhibits entrapment of air within pockets at random locations. The sheets are therefore placed and held in intimate contact with substantially uniform force over the area of the sheets and exposure plate.

DESCRIPTION OF THE DRAWINGS

FIG. 3(a) through (e) are sectional views of apparatus according to the present invention operating to exclude residual air;

FIGS. 9(a) through (d) are partial sectional views of the improved impervious membrane according to the present invention.

DESCRIPTION OF THE PREFERRED EMBODIMENT

Figure 1:
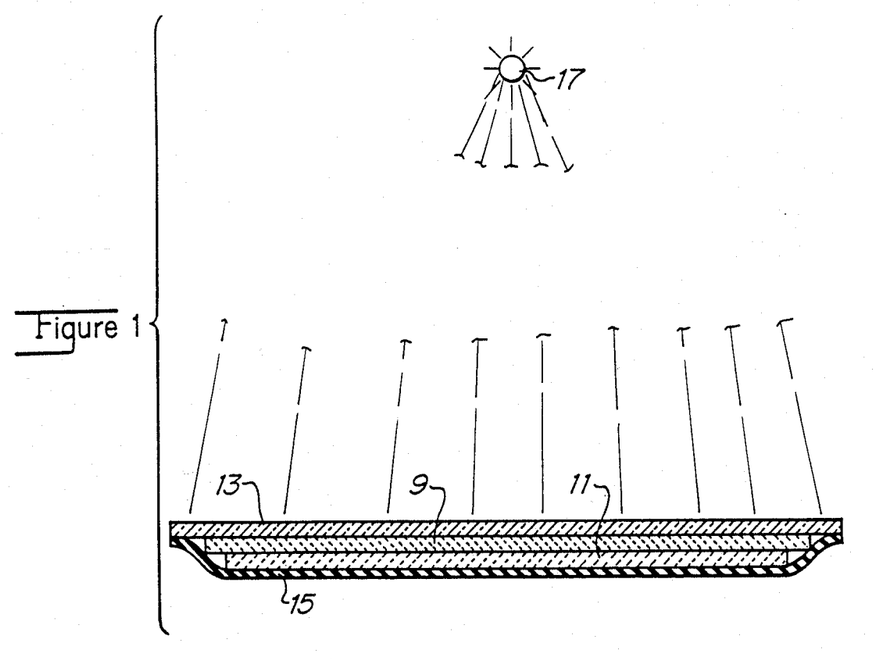
FIG. 1 is a sectional view of exposure apparatus including sheets of photographic material retained against the exposure plate by a flexible blanket.

Referring now to FIG. 1, there is shown a cross-sectional view of a sheet 9 carrying photographic original images and another sheet 11 of photographically-sensitive materials held together and in place against a glass exposure plate 13 by a flexible blanket 15. The sheet materials 9, 11 are held in close surface registration during exposure through the glass plate 13 to a light source 17 positioned above the plate. Structures of this type may also be achieved in inverted orientation when the sheet materials are placed on top of the exposure plate and the flexible blanket 15 weighs down the sheets during exposure to the light source located below the glass plate.

Figure 2:
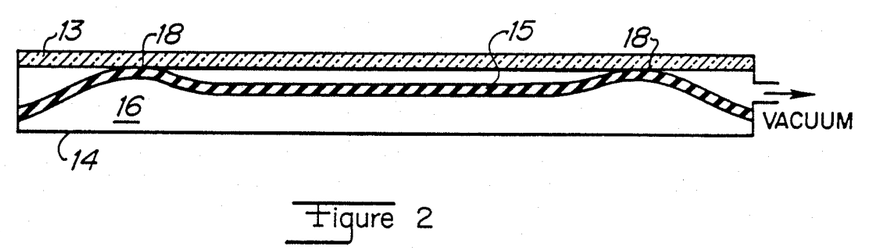
FIG. 2 is a sectional view of vacuum hold-down apparatus illustrating a pocket of air trapped beneath sheets of photographic material.

With reference to the sectional view of FIG. 2, the flexible blanket 15 and photographic sheet materials positioned between the blanket and exposure plate 13 are forced against the glass exposure plate 13 by positive air pressure acting within the chamber 16 on the side of the blanket 15 remote from the plate 13. The positive pressure differential may be established by pressurizing the chamber 16 (within the confining housing 14). However, such techniques commonly isolate pockets of trapped air at locations on the surface of the sheet materials where sufficient air-tight seals 18 formed against the exposure plate (or between sheets) to inhibit evacuation of such volumes of residual air.

In accordance with the present invention, a flexible, gas-impervious blanket or membrane 17 is disposed to separate two air-tight chambers that are formed on opposite sides of the membrane, with the membrane forming a boundary wall of each such chamber, as shown in FIGS. 3(a) through (e). In the first or upper chamber 19, another boundary wall is formed by the exposure plate 13 (which may be hinged or otherwise removable 29 (not shown) to facilitate insertion of photographic sheet materials into the chamber). In the second or lower chamber 20, a controlling air inlet 21 is positioned in an exterior boundary wall 22 of that chamber to limit the ingress of air at ambient pressure into the second chamber. The membrane 15 may be secured and sealed 23 about its periphery to the exterior boundary wall 22 in order to form therewith the air-tight second chamber 20. The first chamber 19 is coupled to a vacuum pump (not shown) for evacuating air 24 from between the sheets 9, 11 and from between the sheets and exposure plate 13 in order to assure fixed surface registration between the two sheets during exposure to light through the exposure plate 13.

Figure 3:
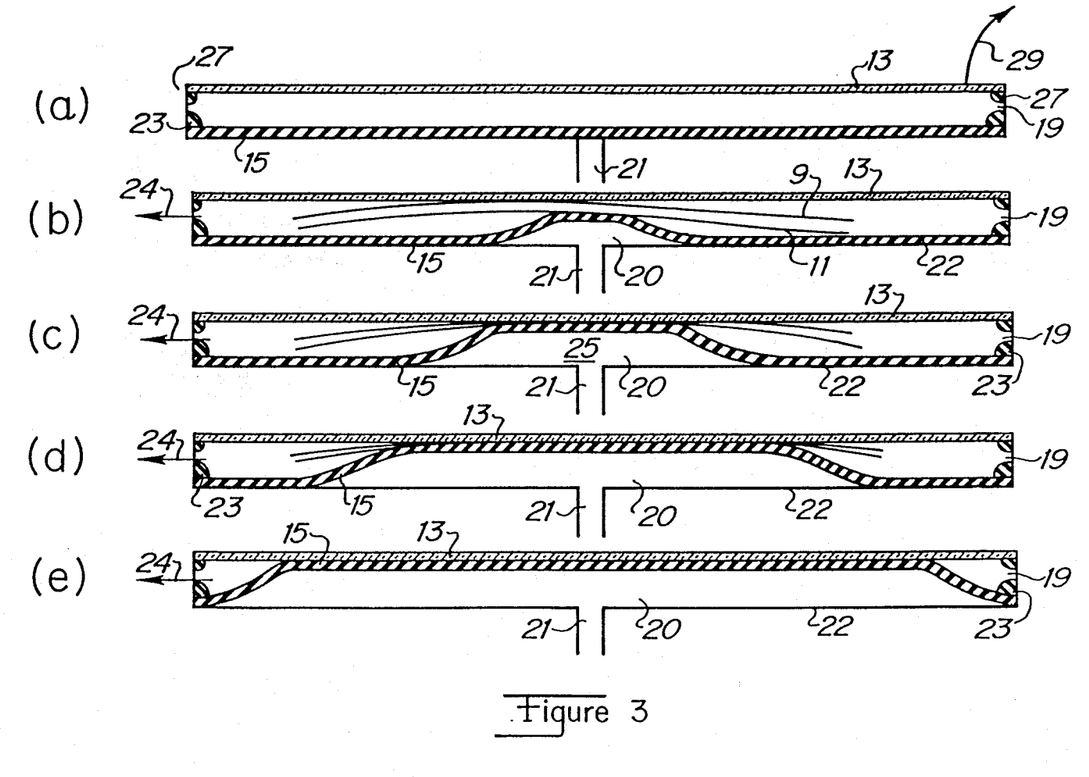

In operation, the inlet 21 limits the rate of flow of air at ambient pressure into the second chamber 20 that is formed beneath the membrane 15. Thus, as air is evacuated 24 from the first chamber 19 above the membrane 15, substantially only the local region of the membrane 15 about the inlet 21 is capable of expanding under the pressure differential between ambient pressure admitted into the second chamber 20 through the inlet 21 and the reduced pressure due to evacuation of air 24 evacuated from the first chamber. The inlet 21 is positioned within the periphery seal 23 of the membrane, as shown in FIG. 3, so that initial expansion of the volume of the second chamber 20 (via flexure of the membrane 15) is limited substantially to the central region 25 about the inlet 21. As evacuation of the first chamber continues, the volume of the second chamber (via flexure of the membrane 15) continues to expand or spread over the surface of the exposure plate 13, as illustrated in FIGS. 3(c) through (e), until the entire surface area of the sheets 9, 11 are progressively pressed together and against the exposure plate 13.

Figure 4:
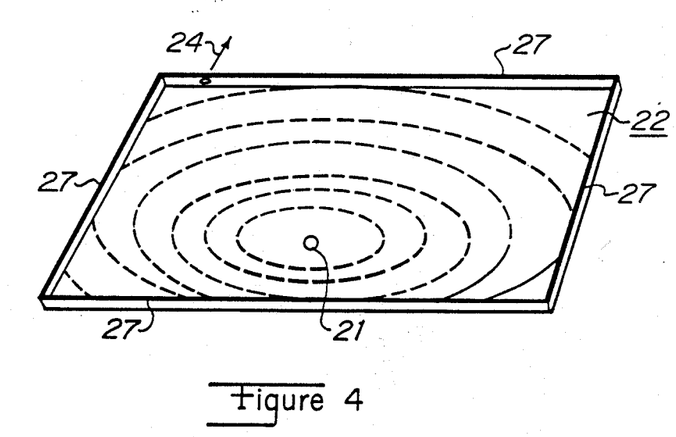
FIG. 4 is a perspective plan view of the lower support plate and air inlet according to the present invention.
Figure 5:
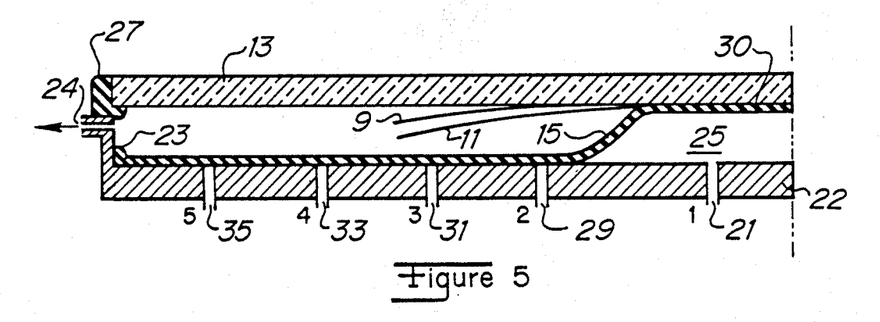
FIG. 5 is a partial sectional view of the apparatus of the present invention for incrementally controlling the migrating hold-down force.

Ideally, the rate of flow of air at ambient pressure through inlet 21 into the second chamber is slower than the rate of flow of air 24 from the first chamber 19 (via a vacuum pump not shown) so that a pressure differential can be maintained across the membrane 15 under conditions which cause progressive, migrating or spreading contact between the membrane 15 and the sheets 9, 11 and the exposure plate 13 from the central location of the inlet 21 toward the periphery of the membrane 15, as illustrated in FIGS. 3(b) through (e). The first chamber may be evacuated through an outside boundary wall, as illustrated in FIGS. 4 and 5, for example, near the perimeter of the membrane 15. In this way, substantially all residual air within the first chamber 19 that might remain between the sheets 9, 11 and between the sheets and the exposure plate 13 and membrane 15, is squeezed out progressively, starting near the inlet 21 and concluding at the perimeter of the membrane 15. The initial surface force is applied at the central position, as shown in FIGS. 3(b) and (c), and spreads out with time, as shown in FIGS. 3(d) and (e), as air at ambient pressure is admitted to the second chamber 20 at controlled rates through the inlet 21.

Referring now to FIG. 5, the partial sectional view of the apparatus of the present invention illustrates a plurality of air inlets 29, 31, 33 and 35 at spaced locations intermediate the substantially central inlet 21 and the peripheral seal 23 of the membrane 15 to the lower platen 22. Each of these inlets restricts the flow of air at ambient pressure into the forming chamber 25 as the membrane 15 expands the area 30 in which force is applied to urge the sheets 9, 11 into surface contact with the exposure plate 13. Initially, as air is evacuated 24 from the region between the membrane 15 and the exposure plate 15, air at ambient pressure enters beneath the membrane 15 initially only through inlet 21. The remaining inlets 29-35 are blocked by the membrane 15 or by active valving techniques, as later described. Thereafter, as the region 25 expands below membrane 15, air enters beneath the membrane 15 additionally through each of the inlets 29, 31, 33 and 35 in turn, so that the rate of expansion of the region 25 beneath the membrane 15 increases with time as air continues to be evacuated 24 from the region between the membrane 15 and the exposure plate 13. The pressure differential thus established across the membrane 15 progressively squeezes out residual air from between the photographic sheets 9, 11 and exposure plate 13 in a pattern that generally progresses from the central location of the initial air inlet 21 toward the outer limits of the peripheral seal 23 of the membrane 23 to the lower platen. The perimeter gasket 27 is provided to facilitate removal of the exposure plate 13 for convenient placement of photographic sheets 9, 11 within the upper chamber, and to form an air-tight seal with the exposure plate 13 when it is in place, as shown.

After exposure of the photographic materials to light through the plate 13, air at ambient pressure may be admitted into the first chamber 19, initially from locations about the periphery of the membrane 15 to progressively decrease the area in which surface force of the membrane 15 (and confined sheets 9, 11) against the exposure plate 13 is removed, substantially in the sequence illustrated by FIGS. 3(e) through (a), in that order. After the air 19, 20, pressure equilibrates in the first and second chambers 19, 20, the exposure plate 13 may be removed as a boundary wall of the first chamber (for example, by detachment from perimeter gaskets 27, as shown in FIG. 4) in order to facilitate removal of the sheets 9, 11 and placement of new photographic materials for contact exposure.

Figure 6:
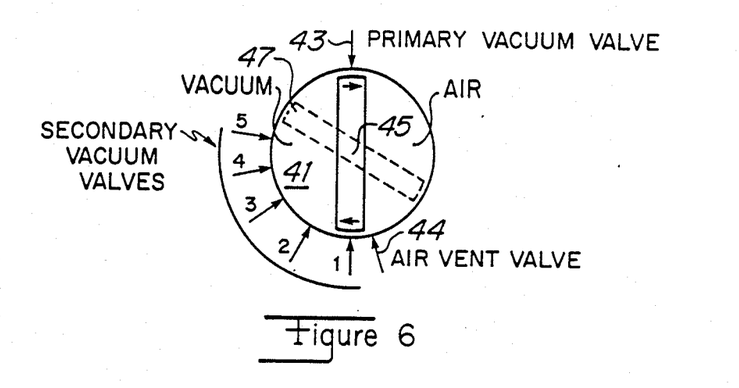
FIG. 6 is a pictorial representation of a control valve for the embodiment of FIG. 5.

Referring now to FIG. 6, there is shown a simplified pictorial representation of a sequential valving scheme that operates with the inlets 21 and 29-35 to control the migrating positioning of the membrane 15 against the exposure plate 13. In operation, each of the inlets 21 and 29-35 (designated 1, 2, 3, 4 and 5 in FIG. 5) are connected to the valve chamber 41, 42 that is coupled to a vacuum supply at conduit 43 and a supply of air at ambient pressure via conduit 44. A rotatable plenum 45 is disposed to separate the different air pressures in the valve chamber 41, 42 and to divert either vacuum or air at ambient pressure to the inlets 21 and 29-35 in sequence. Thus, by rotating the plenum 45 in clockwise direction, vacuum in chamber 41 is removed from inlet 21 and air at ambient pressure is supplied via chamber 42. Similarly, vacuum is removed from each of the remaining inlets 2-5 and air at ambient pressure is supplied thereto as the plenum 45 continues to rotate. When the plenum 45 is positioned 47 to assure that air at ambient pressure from chamber 42 is supplied to all of the inlets 1-5, the membrane 15 in FIG. 5 (together with the photographic sheets 9, 11) is urged against the exposure plate 13 with the full force of the pressure differential across it.

After exposure operations and the photographic sheets 9, 11 are to be removed, the plenum 45 may be rotated counter-clockwise to connect vacuum in chamber 41 to the inlets 5, 4, 3, 2, and 1 in that sequence. The membrane 15 is thereby drawn away from the exposure plate as air at ambient pressure is admitted to the region between the membrane 15 and exposure plate 13. Once the air pressures on both sides of the exposure plate 13 have equilibrated, the exposure plate 13 may be removed to facilitate removal and re-placement of photographic sheets 9, 11.

Figure 7:
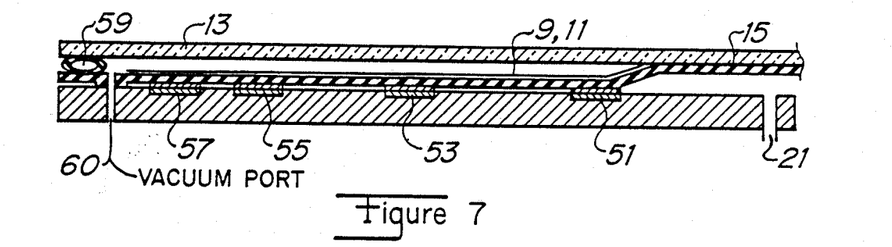
FIG. 7 is a partial sectional view of another embodiment of the apparatus of FIG. 5.

With reference now to the partial sectional view of FIG. 7, there is shown another embodiment of the present invention in which the membrane 15 includes magnetic hold-down means 51-57 spaced at radial or other increments about a central location of an air inlet 21. Of course, these hold-down means 51-57 may include ceramic magnets embedded in the rubber or plastic membrane 15 (similar to gasket construction for refrigerators) for attractive hold-down on the lower platen formed of steel or other magnetic material. Alternatively, flat rings or strips of magnetic material may be positioned within the membrane 15 about the central location of the air inlet 21 for attractive hold-down by permanent magnets positioned in the lower platen to attract the rings or strips of magnetic material.

Figure 8:
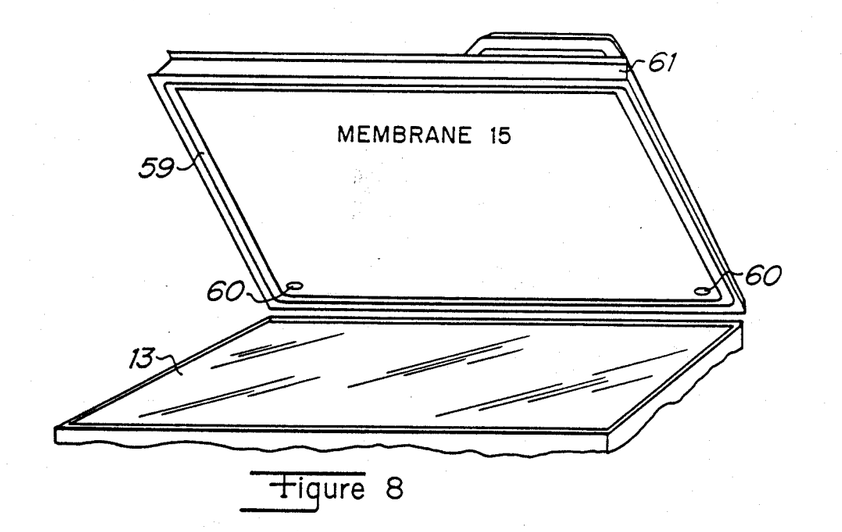
FIG. 8 is a pictorial representation of one exposure apparatus for selectively processing photographic sheets upon a surface platen that is illuminated therethrough from below.

In another embodiment of the present invention, the hold-down means between membrane 15 and the lower platen may include a plurality of resilient filaments connected between the membrane 15 and the lower platen to resiliently bias the membrane 15 away from the exposure plate 13 until evacuation of air from between the exposure plate 13 and the membrane 15 establishes a holding force against the exposure plate 13 that migrates from the central region about air inlet 21 toward the perimeter of the membrane 15 near the seal 59. With reference to the embodiment of the invention illustrated in FIG. 8, the resilient filaments or magnetic hold-down means previously described are particularly advantageous to include with a flexible membrane 15 that is positioned in inverse relationship above the exposure plate 13 that is arranged for exposing photographic sheets therethrough to a light source located below the plate 13. In this embodiment, the membrane 15 is retained in the removable lid 61 that forms the second chamber on the back side of the membrane 15 (inverse of FIGS. 2-5) via a plurality of resilient filaments 63, as illustrated in FIGS. 9(b) through (d) of course, such filaments 63 may be spaced at selected locations and provide graduated resilient force from the least forces near the center to the greatest force near the perimeter of the membrane 15 in order to enhance the migration of the contacting region of the membrane 15 against the sheets 9, 11 and exposure plate 13 as the air therebetween is evacuated.

Figure 9:
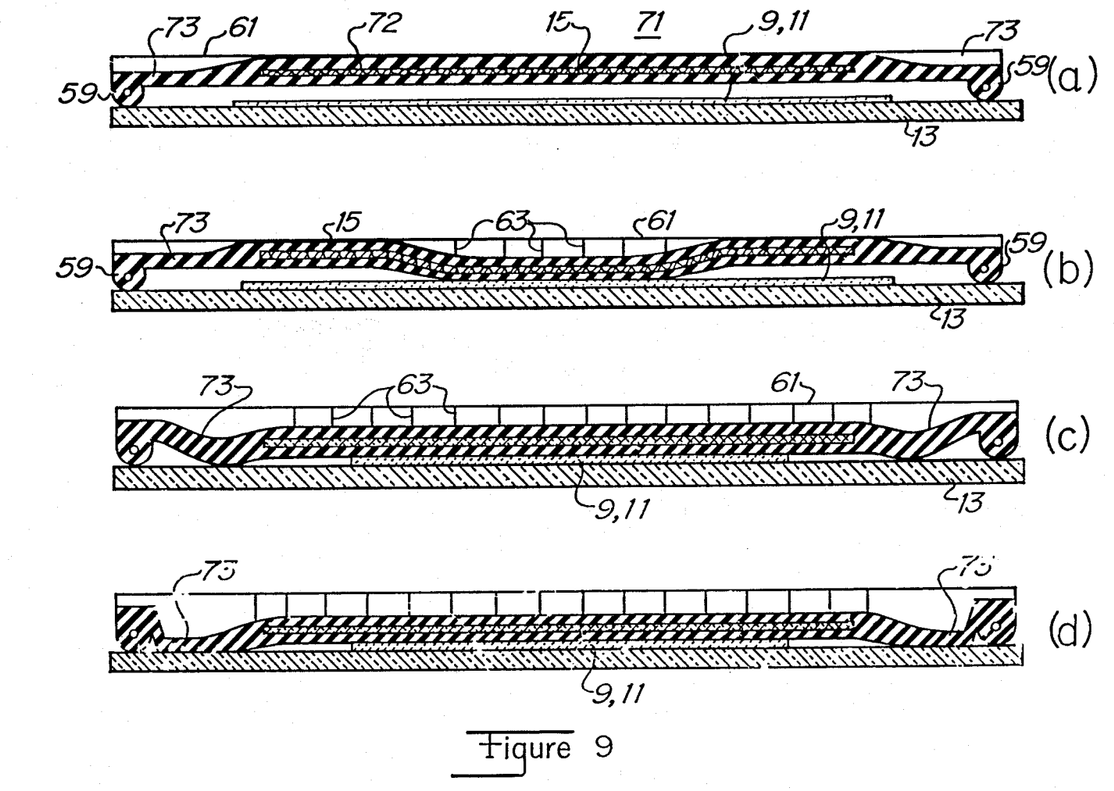

Referring now to FIG. 9(a), there is shown a partial sectional view of an improved membrane 15 according to the present invention. Specifically, the membrane 15 is illustrated as including at least two distinctive regions, each with distinctively different physical characteristics. In the central region 71, the membrane comprises a dimensionally-stabilizing flexible medium such as DACRON or fiberglass woven cloth 72 that is impregnated with resilient and gas-impervious rubber or other similar polymeric material, with such polymeric material also providing a resilient facing on the membrane 15 for contacting sheets 9, 11.

In the surrounding or perimeter region 73 about the central region 71 near the perimeter seal 59, the resilient and gas-impervious rubber portion of the membrane 15 extends continuously to the seal 59, but is formed to exhibit highly flexible characteristics in lateral and longitudinal directions. This may be accomplished by omitting the impregnated woven cloth 72 that is present in the central region 71, or by reducing the thickness of the rubber layer that forms the membrane 15 in the perimeter region 73, or by combinations of such features that assure highly flexible, but dimensionally variable continuation of the membrane 15 throughout the perimeter region 73. Of course, the exterior boundary wall 22 of the removable lid 61 is disposed on the side of the membrane 15 that is opposite the exposure plate 13 to provide the support for the membrane 15 via the resilient filaments 63, or in accordance with any of the embodiments previously described herein. Thus, with the sheets 9, 11 of photographic material positioned on the exposure plate 13 (on registration pins not illustrated), the dimensionally-stable central region 71 initially contacts the sheets 9, 11 and presses them against the exposure plate 13, as illustrated in FIG. 9(b), as the region between the membrane 15 and the exposure plate 13 is evacuated in a manner as previously described. Thereafter, as the portion of the central region 71 of the membrane 15 that contacts the sheets 9, 11 expands under continuing evacuation, as illustrated in FIG. 9(c), lateral migration of the membrane 15 relative to the sheets is inhibited by the dimension-stabilizing material 72 so that one or more of the sheets 9, 11 that register with the membrane 15 cannot be pulled or moved or distorted relative to any other sheets that register with the exposure plate 13. The dimension-stabilizing material 72 may therefore include cloth threads or strips oriented in at least two orthogonal directions, and additionally in the diagonal directions, or may include a thin metal or Mylar layer that is substantially and uniformly dimensionally stable in all directions within the plane of the layer.

As evacuation of the region between the membrane 15 and the exposure plate 13 continues, as illustrated in FIGS. 9(c) and (d), the perimeter region 73 of the membrane 15 is drawn into contact with the exposure plate 13, causing substantial departure from the initial substantially planar configuration of the membrane 15 and requiring lateral elongation of the membrane 15 in the perimeter region 73 to conform to the resultant shape. However, since the central region 71 of the membrane 15 is laterally inflexible, all distortion or lateral elongation of the membrane 15 occurs only in the perimeter region 73 which is beyond the boundary dimensions of the captivated sheets 9, 11.

Therefore, the apparatus and method for supporting photographic sheet materials for contact exposure according to the present invention substantially eliminates air pockets that tend to distort the photographic images on the sheets. In addition, the apparatus is reduced in weight and strength and cost by efficiently using ambient air pressure to provide the requisite surface-oriented holding forces between the photographic sheets and exposure plate.

What is claimed is:

1. Photographic exposure apparatus comprising:
   a radiation transmissive platen disposed to support a photographic sheet in intimate registration with one surface for the exposure thereof to a source of radiation through the platen in a direction toward said one surface;
   another platen spaced away from said one surface of the radiative transmissive platen;
   a flexible, substantially gas-impervious membrane disposed intermediate said one surface of the radiation transmissive platen and said other platen and being sealed substantially about the peripheral boundary thereof with respect to one of said platens for forming a common boundary wall between two gas-impervious chambers and for receiving a sheet of photographic material intermediate said one surface of the radiation transmissive platen and the membrane;
   gas inlet means coupled to the region within the peripheral seal of the membrane for selectively admitting gas into the region;
   means coupled to the region between the membrane and said one surface of the transmissive platen for evacuating gas therefrom to urge the membrane toward said one surface of the transmissive platen in response to differential gas pressure on opposite surfaces of the membrane for supporting a sheet of photographic material in intimate surface registration with said one surface; and resilient hold-down means disposed with respect to the other platen and the membrane for resiliently urging the membrane toward the other platen to promote flexure of the membrane toward the transmissive platen that migrates over said one surface thereof.

2. Apparatus as in claim 1 wherein said resilient means are spaced at intervals about the location adjacent the gas inlet means.

3. Apparatus as in claim 1 wherein said resilient hold-down means includes magnetic means disposed in the membrane and in the other platen to provide attractive force therebetween.

4. Apparatus as in claim 1 wherein said resilient hold-down means includes resilient filaments coupled between the membrane and the other platen to provide attractive force therebetween.

5. Photographic exposure apparatus comprising:
a radiation transmissive platen disposed to receive a photographic sheet in intimate registration with one surface for exposure thereof to a source of radiation through the platen in a direction toward said one surface;
a support platen spaced away from said one surface of the transmissive platen;
a flexible, substantially gas-impervious membrane disposed intermediate said one surface of the radiation transmissive platen and said support platen and being supported on said support platen for selectively forming a gas-impervious chamber with said transmissive platen, and being disposed to communicate with a sheet of photographic material that is received intermediate said one surface of the radiation transmissive platen and the membrane;
support means coupled to the membrane and to the support platen for providing resilient force urging the membrane toward the support platen; and
means coupled to the region between the membrane and said one surface of the transmissive platen for evacuating air therefrom to urge the membrane toward said one surface of the transmissive platen against the resilient force of said support means in response to differential air pressure on opposite surfaces of the membrane for supporting a sheet of photographic material in intimate surface registration with said one surface of the transmissive platen.

6. Apparatus as in claim 5 comprising:
said support means being disposed with respect to said membrane at a plurality of locations over the area thereof for resiliently urging the membrane toward said support platen to promote flexure of the membrane toward the transmissive platen that migrates over said one surface thereof in response to the evacuation of the region between the membrane and the transmissive platen.

7. Apparatus as in claim 6 wherein said support means are spaced at intervals about a selected region of the membrane to supply resilient force that is graduated from least force near the selected region to the most force at locations remote from the selected region.

8. Apparatus as in claim 6 wherein said support means includes magnetic means disposed in the membrane and in the support platen to provide attractive force therebetween.

9. Apparatus as in claim 6 wherein said support means includes resilient filaments coupled between the membrane and the support platen to provide attractive force therebetween.

10. Photographic exposure apparatus comprising:
a radiation transmissive platen disposed to receive a photographic sheet in intimate registration with one surface for exposure thereof to a source of radiation through the platen in a direction toward said one surface;
a support platen spaced away from said one surface of the radiative transmissive platen;
a flexible, substantially gas-impervious membrane disposed intermediate said one surface of the radiation transmissive platen and said support platen and being supported on said support platen for selectively forming a gas-impervious chamber with said transmissive platen, and being disposed to communicate with a sheet of photographic material that is received intermediate said one surface of the radiation transmissive platen and the membrane, said membrane including a dimensionally stable central region that is laterally and longitudinally inextensible and including a portion of the perimeter region about the central region that is laterally and longitudinally flexible;
support means coupled to the membrane in the central region thereof and to the support platen for providing resilient force urging the membrane toward the support platen; and
means coupled to the region between the membrane and said one surface of the transmissive platen for evacuating air therefrom to urge the membrane toward said one surface of the transmissive platen against the resilient force of said support means in response to differential air pressure on opposite surfaces of the membrane for supporting a sheet of photographic material in intimate surface registration with said one surface of the transmissive platen.

11. Apparatus as in claim 10 wherein said membrane includes a layer of laterally and longitudinally inextensible material within the central region thereof and including a surface layer of resilient polymeric material disposed to contact a sheet of photographic material received intermediate the transmissive platen and said membrane.

12. Apparatus as in claim 10 wherein the transition between central region and perimeter region of the membrane is located beyond the boundary dimensions of a photographic sheet that is receivable in contact with the membrane.

13. Apparatus as in claim 10 wherein the cross sectional dimension of said membrane in the central region thereof is substantially thicker than the cross sectional dimension of the membrane in the perimeter region thereof.

14. Apparatus as in claim 11 wherein said layer includes woven cloth having threads oriented at least in lateral and longitudinal directions.

15. Apparatus as in claim 13 comprising gasket means disposed about the perimeter region of the membrane and disposed to selectively form a gas-tight seal with said one surface of the transmissive platen.

16. Apparatus as in claim 11 wherein said layer includes a metal layer.

17. The method of supporting a sheet of photographic material against a platen for exposure to radiation therethrough comprising the steps of:

forming a first pressure chamber including the platen as a boundary wall thereof and disposed to receive the photographic material therein in proximity to the platen;

forming a second pressure chamber separated from the first pressure chamber by a gas-impervious flexible membrane positioned to contact photographic material in the first chamber;

resiliently urging the membrane away from the platen to promote progressive urging of the membrane toward the platen from near a location within the perimeter toward the perimeter of the membrane in response to the evacuation of the first chamber; and reducing the pressure in the first chamber for establishing a difference of pressure across the membrane initially near the location within the perimeter thereof to urge the membrane and photographic material in contact with the platen progressively commencing from near said location toward the perimeter of the membrane.

18. The method according to claim 17 wherein in the step of resiliently urging, magnetic force is established to urge the membrane away from the platen, and is overcome progressively to promote progressive urging of the member toward the platen from near a substantially central location toward the perimeter of the membrane in response to the evacuation of the first chamber.

19. The method of supporting a sheet of photographic material against a platen for exposure to radiation therethrough comprising the steps of:

selectively forming a pressure chamber including the platen and a gas-impervious flexible membrane as boundary walls thereof, and disposed to receive the photographic material therein in proximity to the platen;

resiliently supporting the membrane away from the platen; and selectively reducing the pressure in the pressure chamber for establishing a difference of pressure across the membrane to overcome the resilient support and urge the membrane and photographic material in contact with the platen progressively commencing from a near central region of the membrane toward the perimeter thereof.

20. The method according to claim 19 wherein in the step of forming the pressure chamber, the membrane is formed with a substantially inextensible central region and a dimensionally flexible perimeter region about the central region to provide a flexible boundary wall of the pressure chamber for urging photographic materials positioned therein to contact the platen when in place as a boundary wall of the pressure chamber in response to selective evacuation of the pressure chamber.

21. The method according to claim 19 including the step of:

resiliently urging the membrane away from the platen with resilient force that varies progressively outwardly from a central region toward the perimeter thereof to promote progressive urging of the membrane toward the platen from the substantially central region toward the perimeter of the membrane in response to the evacuation of the pressure chamber.

22. The method according to claim 21 wherein in the step of resiliently urging, magnetic force is established to urge the membrane away from the platen, and is overcome progressively to promote progressive urging of the membrane toward the platen from a substantially central region toward the perimeter of the membrane in response to the evacuation of the pressure chamber.

23. The method according to claim 21 wherein in the step of resiliently urging, elastic members urge the membrane away from the platen at a plurality of locations positioned about the substantially central region.

* * * * *